(12) United States Patent
Mankame et al.

(10) Patent No.: US 8,550,519 B2
(45) Date of Patent: *Oct. 8, 2013

(54) MECHANICAL GRIPPERS UTILIZING ACTIVE MATERIAL ACTIVATION

(75) Inventors: Nilesh D. Mankame, Ann Arbor, MI (US); Douglas Martin Linn, White Lake, MI (US); James W. Wells, Rochester Hills, MI (US); Alan L. Browne, Grosse Point, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 968 days.

This patent is subject to a terminal disclaimer.

(21) Appl. No.: 12/581,118

(22) Filed: Oct. 17, 2009

(65) Prior Publication Data

US 2011/0089708 A1 Apr. 21, 2011

(51) Int. Cl.
*B25J 15/08* (2006.01)
*B25J 15/10* (2006.01)

(52) U.S. Cl.
USPC ........................................ 294/86.4; 294/99.1

(58) Field of Classification Search
USPC ................. 294/86.4, 99.1, 119.1, 103.1, 907; 901/31, 32, 34, 38; 73/862.69; 310/363, 800

See application file for complete search history.

(56) References Cited

U.S. PATENT DOCUMENTS

| | | | | |
|---|---|---|---|---|
| 4,400,642 A | * | 8/1983 | Kiraly | 310/332 |
| 4,533,167 A | * | 8/1985 | Johnson | 294/86.4 |
| 4,610,475 A | * | 9/1986 | Heiserman | 294/86.4 |
| 4,667,997 A | * | 5/1987 | Udagawa et al. | 294/86.4 |
| 5,172,950 A | * | 12/1992 | Benecke | 294/86.4 |
| 5,375,033 A | * | 12/1994 | MacDonald | 361/281 |
| 5,410,944 A | * | 5/1995 | Cushman | 901/29 |
| 7,284,374 B2 | * | 10/2007 | Buerger et al. | 60/592 |
| 7,332,980 B2 | * | 2/2008 | Zhu et al. | 333/32 |
| 8,026,773 B2 | * | 9/2011 | Zhu et al. | 333/32 |
| 2011/0071670 A1 | * | 3/2011 | Mankame et al. | 700/245 |

* cited by examiner

*Primary Examiner* — Jewel V Thompson

(57) ABSTRACT

A mechanical gripper adapted for grasping a plurality of differing objects, and comprising a plurality of fingers, wherein each finger includes at least one variable impedance member comprising an active material element, the element, when activated and deactivated, undergoes a reversible change in impedance, and the change in impedance enables the gripper to be advantageously reconfigured, and/or locked in a reconfigured state.

21 Claims, 9 Drawing Sheets

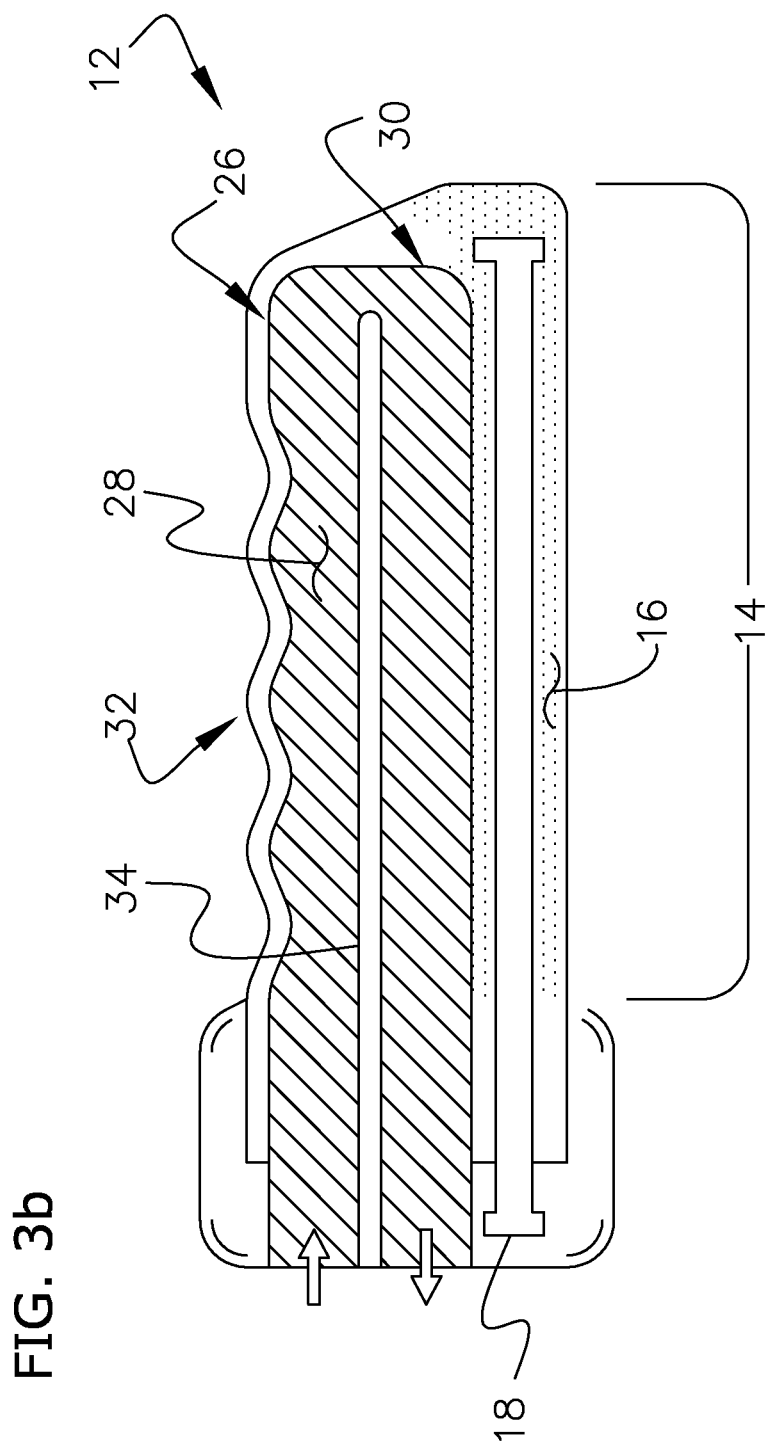

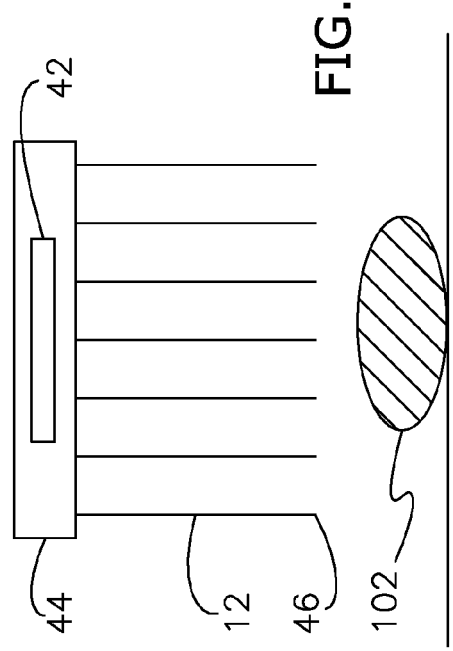
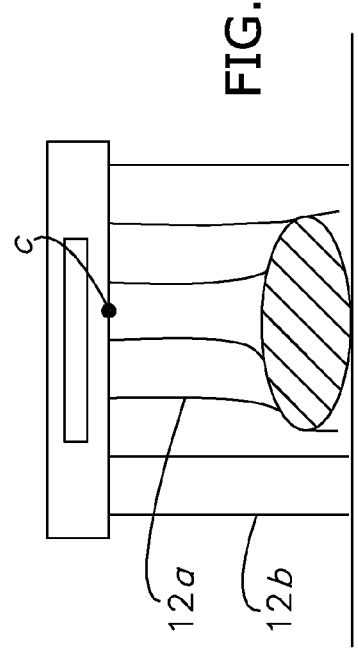
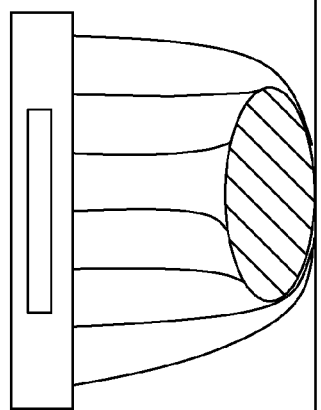
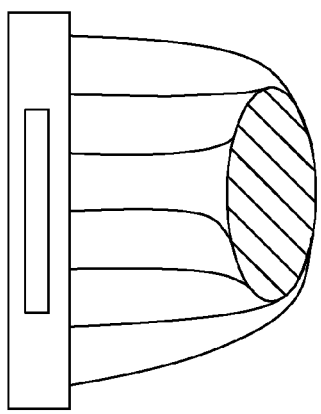

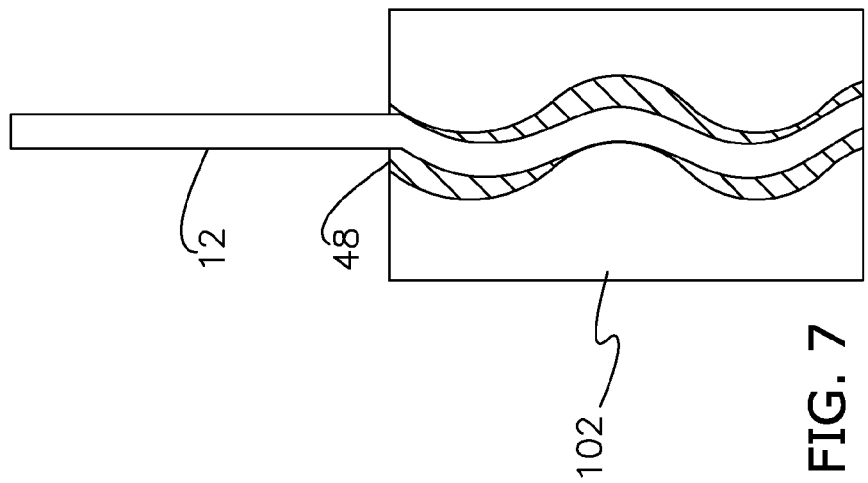
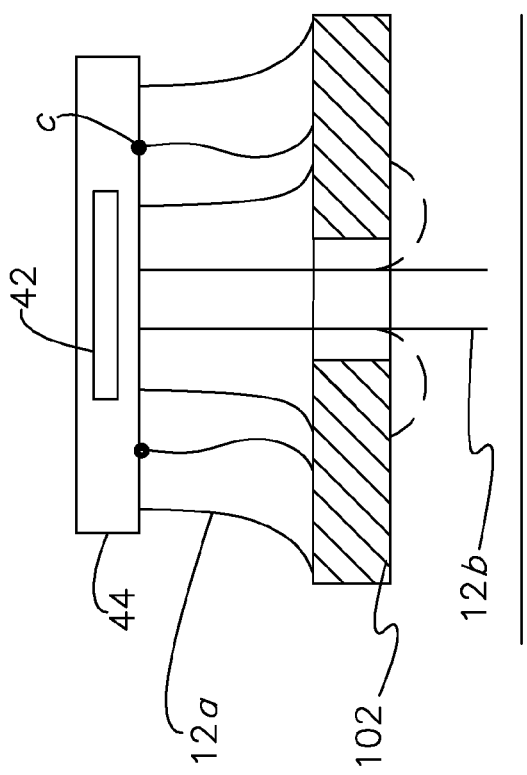
FIG. 6
FIG. 7

MECHANICAL GRIPPERS UTILIZING ACTIVE MATERIAL ACTIVATION

BACKGROUND OF THE INVENTION

1. Technical Field

This disclosure generally relates to a mechanical gripper adapted for use in an autonomously functioning device, such as a robot; and more particularly, to a mechanical gripper comprising a plurality of fingers that utilizes active material activation to facilitate grasping a plurality of differing objects (e.g., workpiece), and effect variable mechanical impedance.

2. Background Art

Fixed impedance mechanical grippers have long been used in devices to autonomously grasp objects. For example, jaws comprising rigid integral members and hinge joints that are articulated by conventional actuators, such as electric motors, solenoids and pneumatic cylinders, are often used in assembly robots to grasp and manipulate workpieces.

Variable impedance passive compliant grippers, including both stiff and flexible elements, have more recently been developed to avoid damaging workpieces and surrounding environments. The stiff elements promote precision, while the flexible elements enable passive compliance. This duality makes the grasp more robust to small variations of the position or configuration of the workpiece, or to the workpiece environment. Concernedly, it is appreciated that passive compliance limits the performance (payload capacity, speed of motion, etc) of the gripper.

The type of grip employed by a mechanical gripper plays a major role in determining the magnitude of force required for a stable grasp, and generally include two types, "friction" or a precision grasp, and "encompassing or power grasp." Friction grippers rely completely on the frictional force between the object and the individual grasp fingers, which is directly proportional to the gripping force, wherein the constant of proportionality ($\mu$—the coefficient of static friction) is typically within the range 0.2 to 0.25. When fragile or delicate workpieces need to be handled by frictional robotic grippers, complex feedback systems are required to ensure that the work piece is not damaged during the grasping process or during transport. Concernedly, however, feedback control typically requires precise motion sensing and correction, complexity (including the injection of extra energy to correct torque/joint force), and additional hardware and software to implement the control strategy, which present barriers to entry and add significant costs to production. For example, it is appreciated that feedback control often requires a large plurality of small parts that increases repair and maintenance costs. Moreover, where the location, orientation, shape, or stiffness/strength of the workpiece to be grasped is not known with sufficient certainty, and a friction gripper is employed, the gripper must typically be oversized to account for the worst case scenario. The extra mass presented thereby and force necessary for actuation, complicates control and results in inefficiencies and waste.

Encompassing grippers cradle the part, add stability to the grasp, and as a result, typically require a smaller gripping force by the individual grasp fingers (e.g. a factor of 1 to 4) than do friction grippers. This type of gripper, however, also presents concerns in the art, including, for example, one-size-fits-all configurations that, in some cases, are not able to grasp objects and workpieces of differing dimensions and shapes. More specifically, the individual fingers of encompassing grippers, though inwardly and outwardly translatable (e.g., pivotal, etc.), typically present relatively fixed or limitedly adjustable configurations. It is appreciated that conventional friction and encompassing grippers are generally not interchangeable.

BRIEF SUMMARY

In response to the afore-mentioned concerns, the present invention recites a mechanical gripper comprising a plurality of fingers including an active material based variable impedance member. As such, the invention presents a single adjustable gripper that can be selectively modified to function as a gripper that can form an encompassing grasp on a wide range of work pieces, and to modulate the mechanical impedance of its fingers as dictated by the task. Where sufficient actuation force is provided, the inventive gripper may be modified to function as a friction or encompassing gripper. Among other things, the invention is useful for variably grasping objects and work pieces of various shapes and sizes in a stable manner while using lower grasp forces than conventional grippers. As such, the inventive gripper is useful for handling delicate work pieces, and for grasping tasks in an unstructured environment, i.e. an environment where the position, orientation, shape, size or other attributes of the workpiece are not known precisely. The invention is also useful for maneuvering the gripper into various hard to reach locations; and finally, the invention is further useful for introducing an active-material based smart gripper.

Generally, the invention concerns a mechanical gripper adapted for use with an autonomously translatable or reconfigurable mechanical device and presenting a first mechanical impedance. The gripper includes at least two fingers comprising at least one variable mechanical impedance member formed of at least one active material operable to undergo a reversible change when exposed to an activation signal, as understood and defined by those of ordinary skill in the art. In one embodiment, a controller is communicatively coupled to the variable member and is operable to selectively cause the element to become exposed to or removed from the signal. Activating the material causes a change in impedance, and in some cases, enables gravity, the application of the gripper, or separate low impedance actuators to change the configuration of the gripper; and deactivation returns the impedance of the finger to the original condition, thereby locking the gripper in its current state.

Other aspects and advantages of the present invention, including exemplary finger and actuator configurations, as well as a smart gripper system, will be apparent from the following detailed description of the preferred embodiment(s) and accompanying drawing figures.

BRIEF DESCRIPTION OF THE SEVERAL VIEWS OF THE DRAWING

A preferred embodiment of the invention is described in detail below with references to the attached drawing figures of exemplary scale, wherein:

FIG. 3b is an elevation view of a finger defining a second channel, and comprises a separator to direct fluid flow, in accordance with a preferred embodiment of the invention;

FIGS. 5a-d are progressive elevations of a smart gripper system comprising a plurality of distending fingers each having a plurality of variable impedance members, encompassingly gripping an object, in accordance with a preferred embodiment of the invention;

FIG. 6 is an elevation of a smart gripper system comprising a plurality of distending fingers each having a plurality of variable impedance members engaging a workpiece defining internal edges; and FIG. 7 is an elevation of gripper finger disposed within a sinuous hole defined by a workpiece, in accordance with a preferred embodiment of the invention.

DETAILED DESCRIPTION

Figure 1:
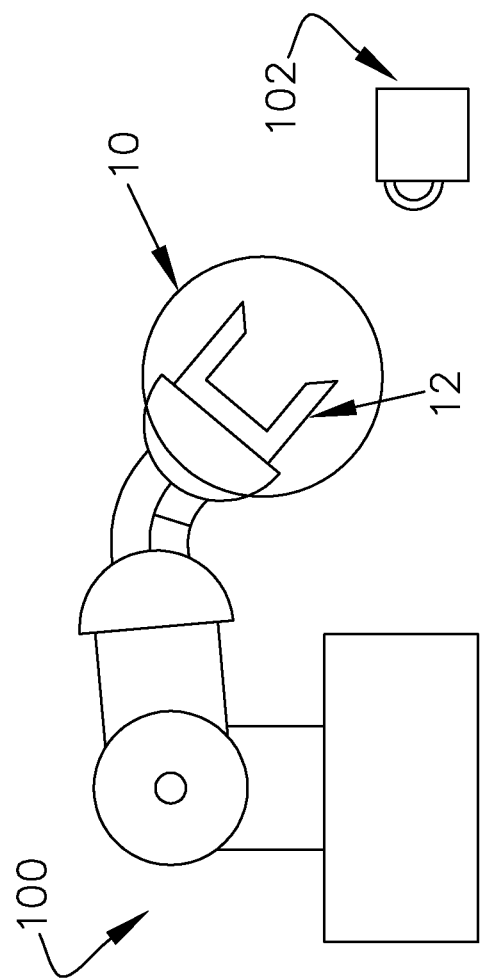
FIG. 1 is an elevation view of a mechanical gripper used in an exemplary mechanical device, in this case a robotic arm, and an object to be grabbed.

The following description of the preferred embodiments is merely exemplary in nature and is in no way intended to limit the invention, its application, or uses. In general, the present invention concerns a variably compliant mechanical gripper 10 adapted for use with an autonomously functioning mechanical device 100, such as an assembly-line robot (FIG. 1). The inventive gripper 10 is suitable for use in a variety of applications requiring variable impedance and/or geometric reconfiguration for better performance. More particularly, the gripper 10 includes at least two fingers 12 comprising a variable impedance member 14 that utilizes the advantages of an active material element 16 (FIGS. 2-5b) to alter the mechanical impedance (e.g., the stiffness and damping ability) thereof. Accordingly, the gripper 10 can be used to grasp irregularly-shaped or large objects 102 (FIG. 1), or objects for which the exact position, orientation, size, and/or shape is not known. The variable impedance members 14, when activated transition to their low impedance state in which they may be manipulated into different shapes to handle a wide variety of objects, to achieve stable grasps in hard-to-reach spaces, and where desirable they can be toggled between encompassing and friction gripping. In their deactivated (i.e., high impedance) state, the more rigid members 14 foster precise motion and high payload capacity.

As used herein, the term "active material" shall be afforded its ordinary meaning as understood by those of ordinary skill in the art, and includes any material or composite that exhibits a reversible change in fundamental (e.g., chemical or intrinsic physical) property, when exposed to an external signal source. Thus, active materials shall include those compositions that can exhibit a change in stiffness, modulus, shape and/or dimensions in response to the activation signal.

Depending on the particular active material, the activation signal can take the form of, without limitation, an electric current, an electric field (voltage), an electro-magnetic field, a temperature change, a magnetic field, a mechanical loading or stressing, a change in the chemical composition and the like. For example, a magnetic field may be applied for changing the property of the active material fabricated from magnetostrictive materials. A heat signal may be applied for changing the property of thermally activated active materials such as shape memory polymer (SMP). UV light of specified wavelength may be used to change the properties of photoactivated SMPs. A change in the pH of the surrounding fluid may also be used to change the properties of some SMPs. An electrical signal may be applied for changing the property of the active material fabricated from electroactive materials, piezoelectrics, and/or ionic polymer metal composite materials.

Exemplary embodiments of the invention are described and illustrated herein, with respect to thermally activated SMP; however, it is appreciated that other active materials, such as, but not limited to, shape memory alloys (SMA), electro-active polymers (EAP), magneto-rheological material (MR), electro-rheological material (ER), and ferromagnetic shape memory alloys (FSMA) may be suited for use.

More particularly, thermally activated shape memory polymers (SMP's) generally refer to a group of polymeric materials that demonstrate the ability to undergo a significant (e.g. >5×) and reversible change in modulus when subjected to an appropriate thermal stimulus. Shape memory polymers are capable of undergoing phase transitions in which their shape is altered as a function of temperature. Generally, SMP's have two main segments, a hard segment and a soft segment. The previously defined or permanent shape can be set by melting or processing the polymer to a temperature higher than the highest thermal transition followed by cooling below that thermal transition temperature. The highest thermal transition is usually the glass transition temperature ($T_g$) or melting point ($T_m$) of the hard segment. It is appreciated that the term "switching temperature" ($T_s$) collectively denotes $T_m$ or $T_g$ as may be appropriate in the context of a given material and application. A temporary shape can be set by heating the material to a temperature higher than the $T_s$ of the soft segment, but lower than the $T_s$ of the hard segment. After processing the material above the $T_s$ of the soft segment, the temporary shape is set by cooling the material. The material can be reverted back to the permanent shape by heating the material above the $T_s$ of the soft segment.

The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., and most preferably less than or equal to about 120° C. and greater than or equal to about 80° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components for forming a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

For the purposes of this invention, it is appreciated that SMP's exhibit a dramatic drop in storage modulus when heated above the $T_s$ of the constituent that has a lower switching temperature. If loading/deformation is maintained while the temperature is dropped, the deformed shape will be set in the SMP until it is reheated while under no load, under which condition it will return to its as-molded shape. While SMP's could be used variously in block, sheet, slab, lattice, truss, fiber or foam forms, they require to be held above the $T_s$ to remain in their lower modulus state.

As previously mentioned, the active material element 16 typically comprises SMP, however, it is appreciated that other analogous active materials, such as a shape memory alloy (SMA), an electro-active polymer (EAP) a magneto-rheological (MR) material, an electro-rheological (ER) material or a combination thereof that yield similar functionality can be used, depending upon the requirements of the application. Various signals may be used to trigger the change in fundamental property (e.g., elastic modulus), including heat, light, pH, and humidity.

Thermally activated SMPs exhibit a much higher (e.g., 5×) inherent viscous damping ability at temperatures in the vicinity of their $T_s$ than conventional elastomers (e.g., rubber). Moreover, as mentioned earlier, the storage modulus of these materials, and hence the stiffness of gripper fingers made of these materials drops significantly above their $T_s$. Therefore, the mechanical impedance of these grippers can be modulated by simply controlling the temperature of the SMP components. Once such a gripper has been reconfigured to form a grasp in its low impedance state, it can be switched back to its high impedance state by lowering the temperature of the SMP components. Until it is switched to the low impedance state again, the gripper will retain its last high impedance configuration subject to material failure and creep limitations. Thus, gripper locking can be obtained without additional expenditure of energy (i.e., a zero-power hold) and without bulky brake/detent systems.

In some embodiments (i.e., constituencies), the SMP material is caused to transition over a small difference in the value of the controlling stimulus and secondarily over a small/ minimum period, so as to effect generally binary (or "sharp") available impedances, in which case the stiffness may be high or low. In other embodiments, transformation occurs over a larger difference and period, so as to effect a gradual change in impedance, and a larger plurality of functional stiffnesses. With respect to the latter, the impedance/stiffness can be varied continuously (though not necessarily linearly) with the level/amplitude of the signal.

The illustrated embodiments show exemplary fingers 12 including at least one variable impedance member 14 and preferably at least one fixed stiffness (or impedance) member 18 (FIGS. 1-7). It is appreciated that the entire finger 12 or only a portion thereof may present the variable stiffness member 14. As shown in the illustrated embodiments, for example, each finger 12 may further include an end section 20 (FIG. 2) configured to facilitate interconnection with the remaining gripper structure. The fixed impedance member 18 has a cross-section that allows the finger 12 to bend readily in the desired plane (shown in hidden-line type in FIG. 3a), but provides high off-axis stiffness and a restoring force that works to return the finger 12 to the original condition. The fixed impedance member 18 preferably consists of a hard polymer or spring steel. Finally, it is appreciated that the finger 12 may be protected from the environment by a cover (not shown).

The total stiffness of all variable impedance members 14 ($k_{tL\ VS}$) in their low stiffness state should be substantially (e.g., 25%, more preferably 50%, and most preferably 75%) less than the total stiffness of all fixed impedance members 18 ($k_{t\ FS}$). When all of the variable impedance members 14 have been caused to achieve the low stiffness state by an activator 22 (e.g., thermal resistance element), the stiffness of the fixed impedance members 18 dominates the stiffness contribution from the variable impedance members 14. The number, materials, shape and size of the fixed impedance members 18 are chosen such that the combination of $k_{t\ FS}$ and $k_{tL\ VS}$ is the lowest desired stiffness of the gripper 10.

The total stiffness of all variable impedance members 14 in the high stiffness state ($k_{tH\ VS}$) is substantially (e.g., 25%, more preferably 50%, and most preferably 75%) greater than ($k_{t\ FS}$). In this condition, the variable impedance members 14 control the overall stiffness of the gripper 10. The number, materials, shape and size of the variable impedance members 14 are chosen such that the combination of $k_{t\ FS}$ and $k_{tH\ VS}$ is the highest desired stiffness of the gripper 10. Intermediate stiffnesses can be attained by switching a subset of the variable impedance members 14 to their low stiffness state (for binary stiffness members 14), or by switching their stiffnesses only partially (for gradually varying stiffness members 14).

Intermediate stiffnesses can also be accomplished by using variable impedance members 14 that comprise sub-elements with different activation stimulus levels. As an example, the variable impedance members 14 may form a laminate comprising SMPs with two different switching temperatures ($T_1 < T_2$). As such, when the variable impedance member 14 temperature is T ($T < T_1 < T_2$) both SMPs are in their high stiffness states; when the temperature is T ($T_1 < T < T_2$), the $SMP_1$ is in the low stiffness state and $SMP_2$ is in the high stiffness state; and finally, when the temperature is T ($T_1 < T_2 < T$) both SMPs are in the low stiffness states. The volume and distribution of the active material should be such that there is enough material to produce the desired variation in stiffness (i.e. from ($k_{tL\ VS}$) to ($k_{tH\ VS}$)), but not too much to avoid low operating frequencies due to latencies in the activation/de-activation processes.

It is appreciated that the default (i.e. un-activated) state of the SMP-based members 14 is the high stiffness state, whereas it is the low stiffness state for other active materials. A biasing stimulus or otherwise mechanism/material composition may be used to invert this relationship. Some examples of such inversions are: a member 14 that uses an SMP whose $T_s$ is below the normal operating temperature, such that the SMP is in the low stiffness state by default, but switches to a high stiffness state when it is cooled to below $T_s$; and a member 14 that uses an MR elastomer that is under the influence of a permanent magnetic field such that the high stiffness state is presented until a solenoid-induced field is used to cancel the magnetic field and revert the MR member 14 to the low stiffness state.

When the variable stiffness members 14 are in a low stiffness state, they may be caused to achieve a deformed or second configuration, wherein the initial configurations are non-grasping positions relative to the object 102, and the second configurations produce an encompassing or friction grip. Where the object 102 is larger than the total space encompassed by the gripper 10, only partially encompassing grips may be used. The deformation may be passively induced such as by gravity or by mechanical interaction with the workpiece, a mold, or a guide, or the fingers 12 may be actuated by low impedance actuators 24 operable to impart an actuation force and/or moment to the variable members 14. Exemplary actuators 24 include antagonistic cables, pre-strained SMA wires, EAP actuators, and the like, running through dedicated routes in the members 14 (FIGS. 2,4); and at least one channel 26 selectively retaining a pressurized fluid 28.

Figure 2:
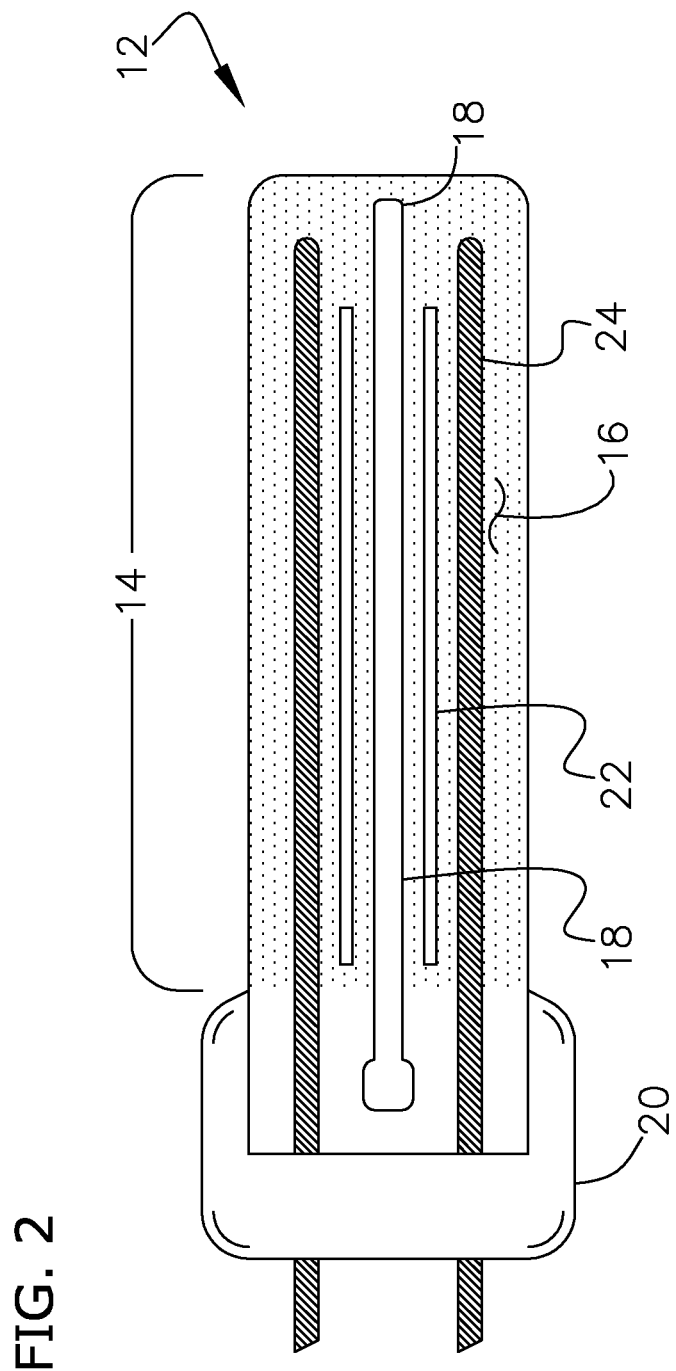
FIG. 2 is an elevation view of a gripper finger comprising a variable impedance member including an active material element in the form of thermally activated SMP, an activator in the form of an embedded resistive heater, and a low impedance actuator system in this case comprising antagonistic cables running through dedicated routes in the variable member, in accordance with a preferred embodiment of the invention.

In an exemplary embodiment, FIG. 2 shows a finger 12 comprising a variable impedance member 14 extending the full functional length of the finger 12, and including an active material element 16 composed of SMP having a $T_s$ above the normal operating temperature and shown as an encasing layer. The finger 12 further comprises an activator 22 (e.g., in the form of a resistive) heater embedded within the SMP, and laterally spaced low impedance actuators 24 in antagonistic pairs. As previously discussed, when the activator 22 is off, the variable impedance member 14 presents a high impedance state, and the overall stiffness of the gripper 10 is maximized. When the activator 22 is energized, the generally adjacent SMP material is heated and its elastic modulus decreases as the temperature approaches $T_s$. The transition to its low modulus (and low impedance) state is completed at some temperature $T_H > T_s$. In this state, the stiffness of the gripper 10 is low, such that the finger 12 forms a joint and becomes reconfigurable (i.e., malleable, pliable, bendable, etc.). It is appreciated that as $T_H$ approaches $T_s$ the stiffness may decrease while the dampening increases, so as to result in a net increase in impedance.

When the activator 22 is turned off again, the SMP cools, so as to regain its higher modulus. At some temperature ($T_L < T_s$), the SMP recovers its high storage and loss moduli completely. If the cooling is done while the gripper 10 is in a deformed state, the deformation is locked in and retained. Reheating the element to a temperature ($T > T_s$) in the absence of any deformation/loads restores the original or un-deformed state of the gripper 10. Thus, the fingers 12 can be locked in an adjusted position without expending additional energy (i.e. zero-power hold), and subsequently returned to their original configurations for future use.

Furthermore, the antagonistic actuation concept can be extended to multiple degrees of freedom. Depending on the construction of the finger 12, the layout of the actuators 24, and the actuation control logic, the actuators 24 can provide not only multi-plane bending, but also twisting and axial compression. The stiffness of the finger 12 can be varied between a low value at temperatures above $T_s$ and a high value at temperatures below $T_s$; and the variation can be gradual or sharp depending on the composition of the chosen material.

Figure 3A:
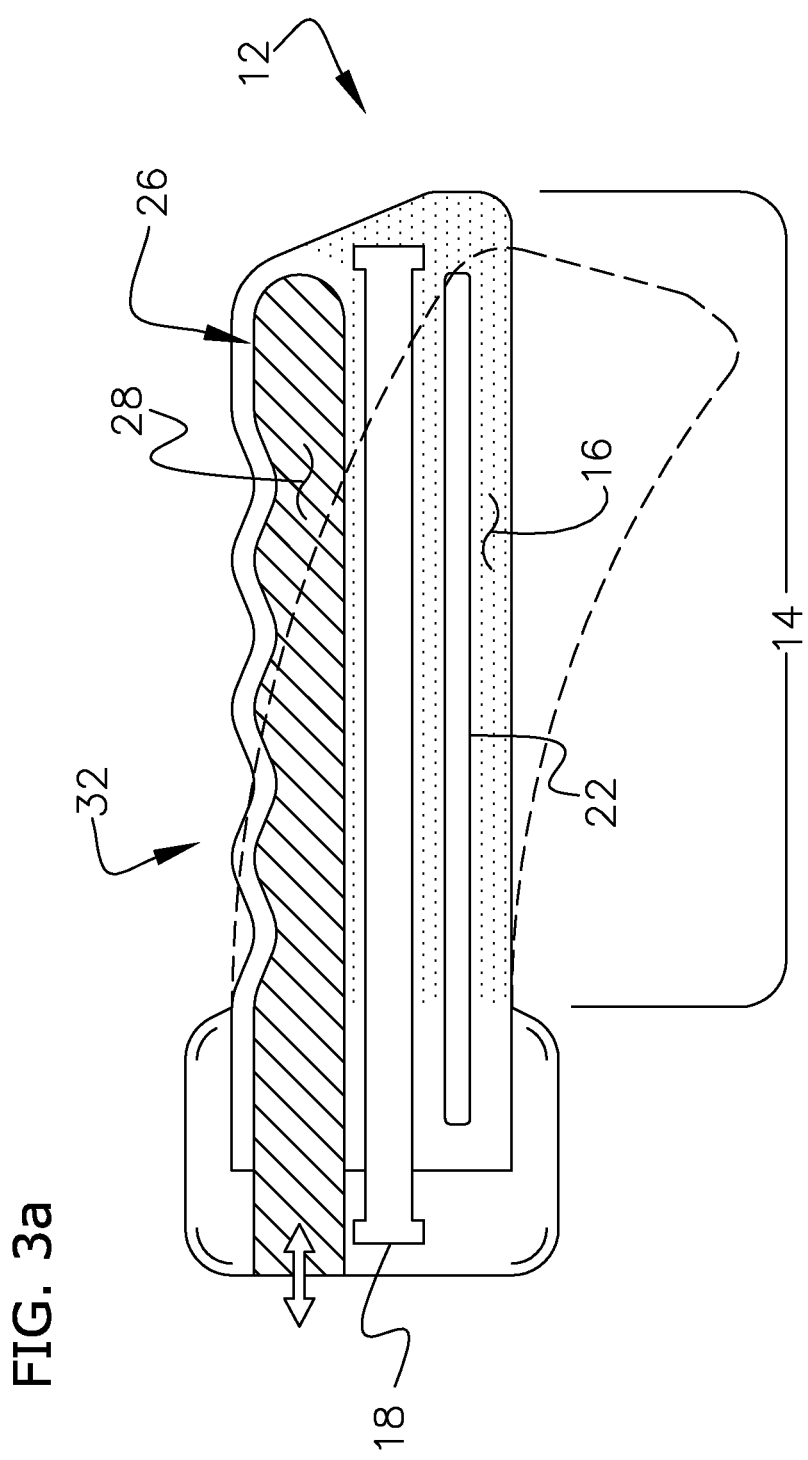
FIG. 3a is an elevation view of a finger comprising a fixed impedance member mechanically in parallel with a variable impedance member and defining a bellow, and a channel operable to convey a pressurized fluid, shown in its original configuration (continuous-line type) and in a reconfigured state (hidden-line type), in accordance with a preferred embodiment of the invention.
Figure 3C:
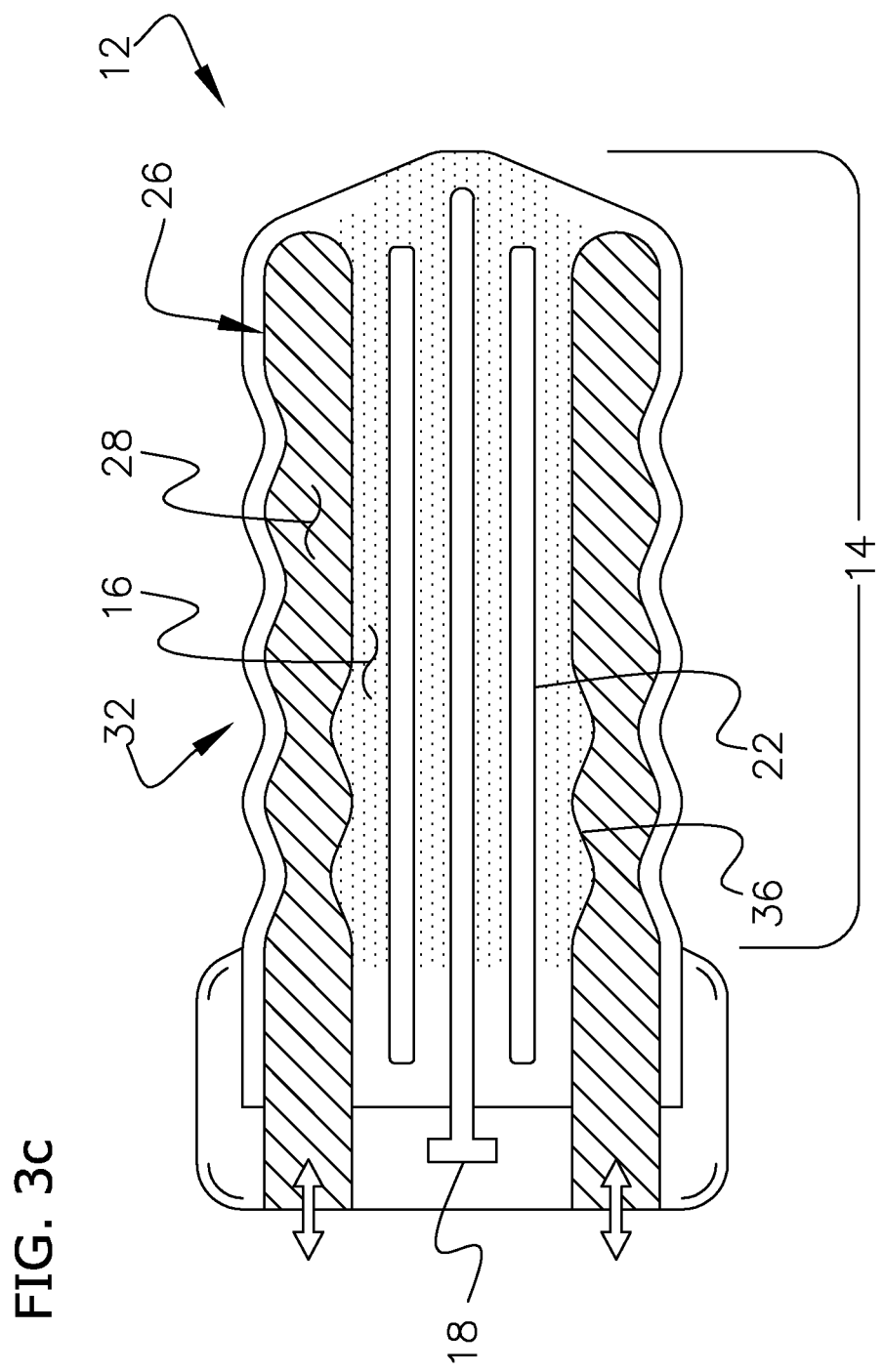
FIG. 3c is an elevation view of a finger defining two opposite channels within which pressurized fluid is operable to actuate the finger in dual directions, and an axial bellow that enables axial extension and contraction, in accordance with a preferred embodiment of the invention.

FIGS. 3a-c show exemplary embodiments comprising a low impedance actuator 24 including at least one channel 26 that is used to retain or convey a pressurized fluid 28 (e.g., air, water, carbon dioxide, etc.). In addition to causing the finger 12 to bend when the low stiffness members 14 are activated, the fluid 28 may be heated and used to activate the active material element 16 or maintain the element 16 in the activated state. In such configurations, the fluid 28 may provide the sole activation signal, wherein it therefore presents a heated temperature above $T_s$, or be combined with other activation sources. Alternatively, the fluid 28 may be used to accelerate cooling the active material element 16. Finally, it is appreciated that the activator 22 may be further used to pressurize the fluid when retained in the channel 26 by also heating the fluid.

In embodiments comprising fingers 12 defining one channel 26, such as shown in FIGS. 3a,c, the channel 26 presents a single inlet/outlet, wherein the fluid 28 both enters and exits. Where the fingers 12 define at least two channels, e.g., inlet and outlet channels 26,30 (FIG. 3b), the inlet channel 26 is preferably caused to expand. To that end, a bellow 36 is defined in the outer wall of the channel 26, so as to enable the finger 12 to expand at this location. The bellow 32 is preferably made of a suitable polymer such as urethane, and may be bonded to the variable impedance member 14. Alternatively, fingers 12 defining channels typically present a reduced wall thickness opposite the variable impedance member 14. Especially in embodiments where the wall is the same material as the variable impedance member 14, the wall thickness is preferably a value smaller than (e.g., preferably 50% of) the thickness of the member 14, so as to facilitate bending of the finger 12 away from the wall side. It may, however, be beneficial to have a wall thickness equal to or even larger than the member 14 in instances where multiple bending configurations are possible.

More particularly, in FIG. 3a, when pressurized fluid 28 is caused to enter the channel 26 and stretch out the bellow 32, the finger 12 bends downward until it achieves an equilibrium configuration. Here, the force produced by the pressure is balanced by the combined restoring force exerted by the fixed and variable impedance members 18,14. The magnitude of pressure in the finger 12, the temperature of the variable impedance member 14 and the stiffness of the fixed impedance member 18 in that direction control the extent to which the finger 12 bends in a direction. The fixed impedance member 18 and the variable impedance member 14 are cooperatively configured such that a reasonable fluid pressure is sufficient to achieve the desired range of motion.

Once the finger 12 has reached the desired configuration, the activator 22 turns off, and the returning fluid (FIG. 3b) preferably cools the active material element 16 below $T_s$. This causes the SMP to stiffen and lock the finger 12 in the new configuration. In this state, the restoring force produced by the fixed impedance member 18 is insufficient to deform the finger 12. After the finger 12 is locked into the desired configuration, the fluid pressure can be removed.

In FIG. 3b, the second channel 30 is partially separated from the first channel 26 by a separator 34. The pressurized fluid 28, preferably air, enters the finger 12 from the first channel 26 and leaves through the second channel 30 (the enter and exit designations may be switched). Again, the air may present a temperature above $T_s$, so as to heat and activate the variable impedance member 14. The pressurized fluid stretches out the bellow 32. Once the finger 12 has reached the desired configuration, the flow rate of hot pressurized air 28 is gradually reduced and replaced by cold air at the same pressure, which stiffens the variable impedance member 14. Once the finger 12 is locked into the desired configuration, the air pressure can be removed.

FIG. 3c shows a variation of the embodiment in FIG. 3a, wherein multiple one-way channels 26 allow the finger 12 to be actuated in opposite directions. Here, the preferred finger 12 further comprises an axial bellow 36 made of an active material, preferably SMP. The axial bellow 36 may be thermally insulated from the activators 22 and has a separate dedicated heater (not shown) to control its temperature. When activated, the axial bellow 36 functions to enable axial extension, and as such provides an additional degree of freedom for the variable impedance member 14.

To deflect the finger 12 upward, both activators 22 are turned on until the active material element 16 temperature rises above $T_s$. The pressure in the bottom channel 26 is then increased above that in the top channel causing the finger 12 to deflect upward. The pressure differential can be created by controlling the pressure of the air 28 in the bottom channel 26, or by controlling the current flow to the resistive heater in the bottom channel such that it heats an enclosed volume of air above $T_s$. The finger 12 is designed such that when the pressures in both channels 26 are equal, there is no net bending moment exerted on the finger 12. Therefore, if both channels 26 are pressurized to the same high value and the axial and lateral bellows 36,32 are heated above $T_s$, the finger 12 is operable to extend axially. The finger 12 may be designed without the axial bellow 36, in which case the finger 12 would not extend but merely increase in overall stiffness and/or width.

Figure 3D:
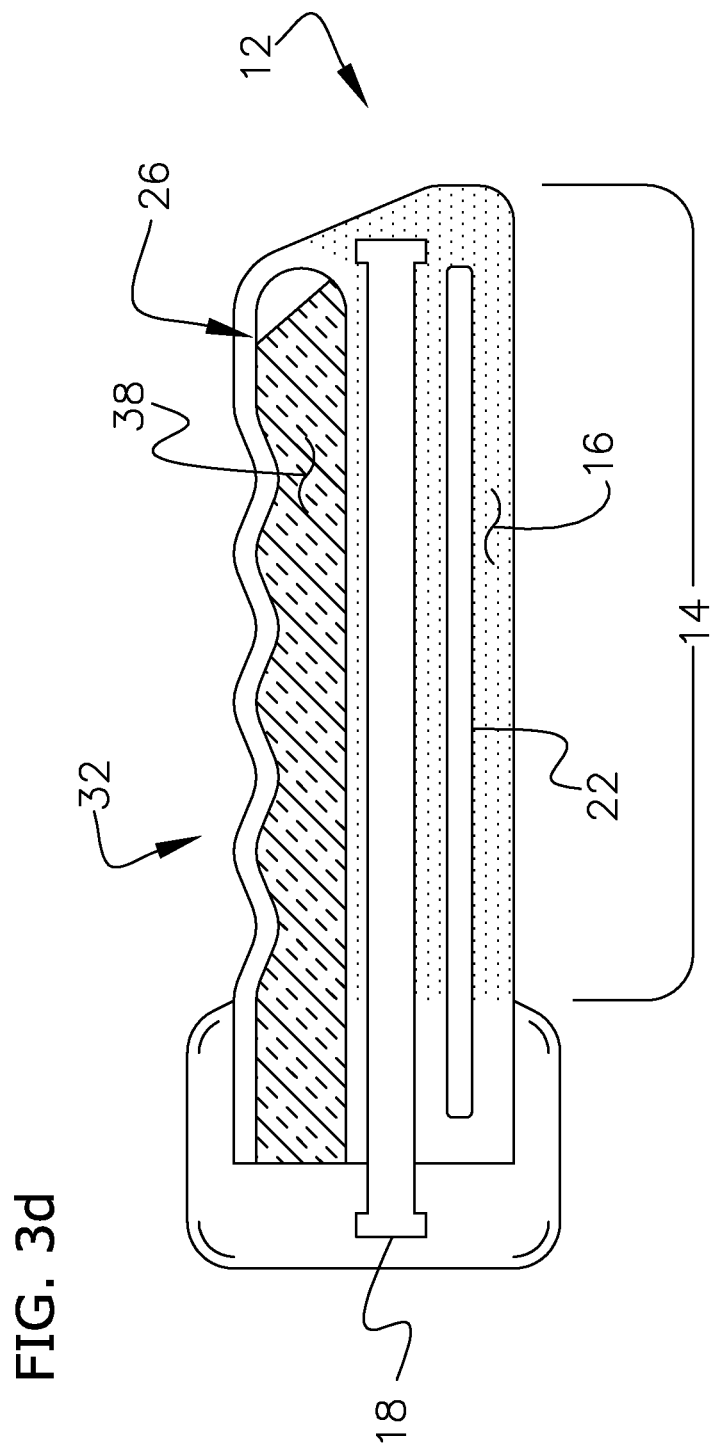
FIG. 3d is an elevation of a finger defining an enclosed space wherein matter that exhibits large volumetric increases when caused to undergo a phase change is disposed, in accordance with a preferred embodiment of the invention.

Similarly, and as shown in FIG. 3d, it is appreciated that matter 38, which exhibits a large, reversible change in volume when caused to undergo a phase change, such as a solid to liquid, or liquid to gas phase change, may also be retained within an enclosed channel 26 or space defined by the finger 12. Here, the matter 38 is heated past its phase changing temperature range to effect the volumetric expansion when bending is needed. Exemplary phase changers include paraffin wax, and water-steam.

Figure 4:
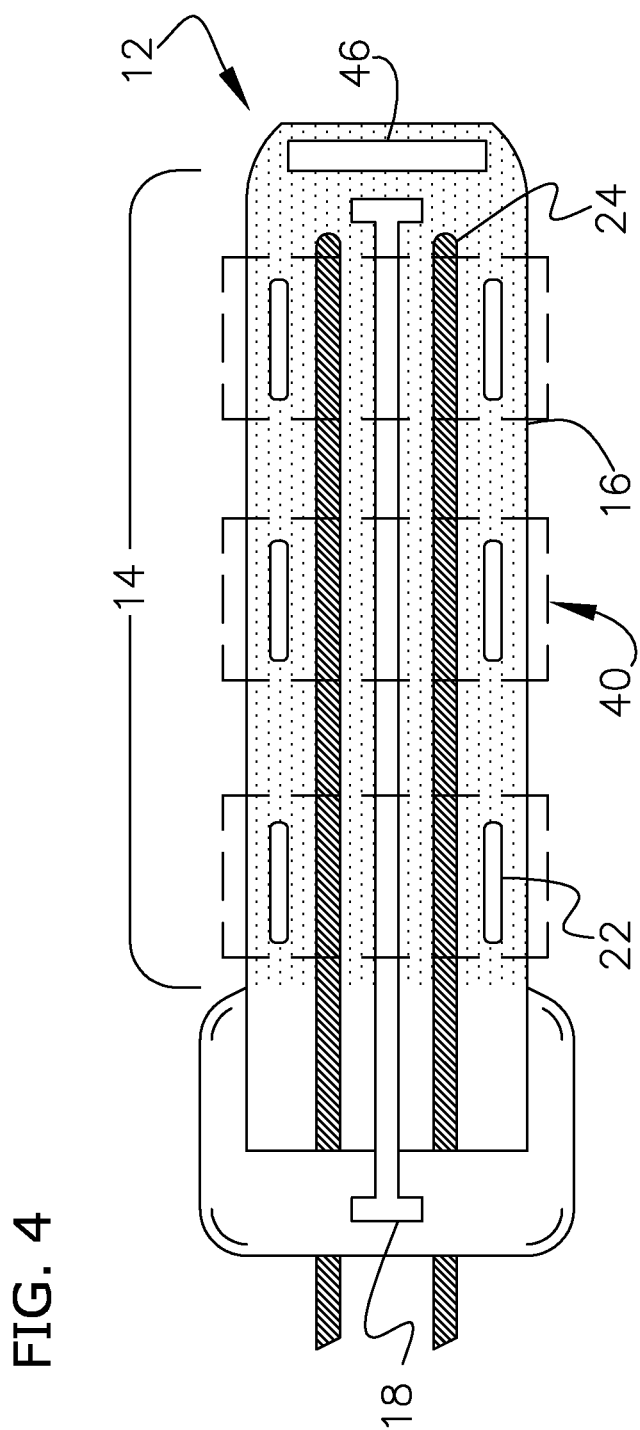
FIG. 4 is an elevation view of a finger comprising a variable impedance member embedded with activators in discrete regions, a fixed impedance member mechanically parallel with the variable impedance member, and a low impedance actuator system in the form of antagonistic cables running through dedicated routes in the variable impedance member, in accordance with a preferred embodiment of the invention.

FIG. 4 is a variation of the finger 12 shown in FIG. 2, wherein the overall impedance of the finger 12 is altered by changing the status of discrete regions 40 of the member 14. A plurality of separately controlled activators 22 are embedded in the discrete regions 40. The other areas not embedded with activators 22 have a fixed stiffness and thus are not changed. The regions 40 embedded with activators 22 (variable regions) may be independently activated and deactivated, so as to rise above or fall below $T_s$. As in the previous embodiments, the preferred variable impedance member 14 is formed of a thermally activated SMP with a $T_s$ greater than the operative temperature of the environment. The default (e.g., deactivated) stiffness of the active material element 16 is such that the regions 40 are normally rigid. With a proper selection of material, and geometry the bending stiffness of variable regions 40 in this state can be made to be considerably larger than its value in the activated state. It is appreciated that many variations in the structure of the finger 12 are made possible if a large plurality of activators 22 are distributed in the finger 12.

In another aspect of the invention, it is appreciated that the gripper 10, where further comprising a controller 42 communicatively coupled to the fingers 12, may present a smart system operable to selectively actuate individual fingers 12 as necessary to grip a particular object or workpiece 102. As shown in FIGS. 5a-d, for example, a plurality of articulating fingers 12 may distend from a base plate 44 and cooperate to search for and encompass an object 102. To that end, the fingers 12 preferably present discrete variable regions 40 as shown in FIG. 4, and more preferably, full length variability as shown in FIG. 2. Each finger 12 is associated with a proximity or pressure sensor 46, such as a piezo-based sensor, operable to deliver a signal to the controller 42 when caused to come into contact with the object 102 (FIGS. 4, 5b, 6).

The relative positioning of the fingers 12 is known by the controller 42, such that when contact is detected by an individual finger or group of fingers 12a, the controller 42 causes at least a portion of the fingers 12 to bend towards the contacted finger or group. For example, where a finger 12 comprises four quadratically spaced actuators 24, the controller 42 may be programmably configured to selectively actuate one or more of the actuators 24 to effect forward, rearward, left, right, forward-left, forward-right, rearward-left, or rearward-right bending. In FIG. 3a, each finger 12 is in the low impedance state as the gripper 10 is lowered. A centroid, c, is determined based on the fingers 12a that come into initial contact presumably with the workpiece 102; and when all finger sensors 46 indicate contact (FIG. 5b), the controller 42 determines that a mold, support, floor, or otherwise base structure has been reached. For subsequent application, it is appreciated that a reference point for activating the actuators 24 may be set just before the fingers 12 engage the floor, base, etc. The non-contacting fingers 12b are then activated so as to radially bend towards a reference line passing through the centroid, according to their relative positions, to produce an encompassing grip (FIG. 5c). Actuation is maintained until the variable stiffness members 14 are allowed to cool. Once cooled to their high stiffness state, the actuators 24 may be disengaged, as it is appreciated that the fingers 12 are in a locked condition. The fingers 12 are then lifted with the workpiece 102, so as to clear the floor (FIG. 5d).

Alternatively, the fingers 12b may be actuated away from the centroid (or opposite the encompassing configuration), in order to securely engage certain objects and workpieces 102. For example, FIG. 6 shows a plurality of fingers 12 engaging a workpiece 102 that defines an internal edges (e.g., a hole). Non-contacting internal fingers 12b pass through the hole and are caused to radially bend preferably away from the centroid for this subset of fingers. Finally, in FIG. 7, a finger 12 is shown internally disposed within a sinuous hole 48 defined by a workpieces 102. Here, the finger 12 is fully activated to enable insertion; and then once sufficiently inserted fully deactivated to form an interlock. The workpiece 102 can then be lifted and/or carried to another station. To release the workpiece 102, the finger 12 is again activated, so as to achieve its low impedance state, and then pulled from the hole 48. In either configuration, the preferred gripper 10 is further configured to detect re-engagement with the workpiece support in order to trigger release of the object 102; and to that end, may include at least one stress/strain sensor (not shown) communicatively coupled to the fingers 12 and operable to determine the transfer of a significant portion of the workpiece weight.

This invention has been described with reference to exemplary embodiments; it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

Ranges disclosed herein are inclusive and combinable (e.g. ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g. the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A mechanical gripper adapted for autonomously grasping an object, said gripper comprising:
   a plurality of fingers presenting a first cooperative configuration and a first mechanical impedance, wherein each finger includes at least one variable impedance member comprising at least one active material element operable to undergo a reversible change when subjected to or removed from an activation signal, so as to be activated and deactivated respectively, and presents a second impedance less than the first when the element is activated or deactivated, the fingers are caused to achieve a second cooperative configuration when at least one member presents the second impedance, and the fingers and object are cooperatively configured such that at least a portion of the fingers grasp the object when caused to achieve the second configuration in a first position relative to the object.

2. The gripper as claimed in claim 1, wherein the gripper further comprises at least one low impedance actuator configured to subject the variable members to an actuation force, an actuation moment, or a combination thereof.

3. The gripper as claimed in claim 2, wherein said at least one low impedance actuator is selected from the group consisting essentially of cables, pre-strained shape memory alloy wires, or electro-active polymer actuators embedded or running through dedicated routes in the variable member.

4. The gripper as claimed in claim 2, wherein each finger defines at least one channel, and said at least one low impedance actuator includes a pressurized fluid disposed within said at least one channel and operable to cause the fingers to achieve the second configuration when at least one member presents the second impedance.

5. The gripper as claimed in claim 4 wherein the fluid is heated and is further operable to at least partially activate the element.

6. The gripper as claimed in claim 5, wherein the finger defines inflow and outflow channels within which the fluid enters and exits the finger respectively.

7. The gripper as claimed in claim 4, wherein the pressurized fluid is produced by phase changing matter operable to undergo a large volumetric expansion when caused to undergo a phase change.

8. The gripper as claimed in claim 4, further comprising:
   at least one activator configured to activate the element and modify the pressure of the pressurized fluid.

9. The gripper as claimed in claim 2, further comprising:
   at least one proximity or pressure sensor operable to detect contact between at least one of the fingers and the object; and
   a controller communicatively coupled to the sensor and said at least one actuator, and operable to cause the force or moment only when the contact is detected.

10. The gripper as claimed in claim 9, wherein the controller is configured to determine contacting and non-contacting fingers and a centroid of contacting fingers, and is further configured to cause the non-contacting fingers to bend towards or away from the centroid.

11. The gripper as claimed in claim 1, wherein the member defines first and second opposite sides, each side is stretchable, bendable, or a combination thereof, and the sides are cooperatively configured so as to cause the member to bend in opposite directions or axially extend or axially compress by an actuation force, when in the second impedance.

12. The gripper as claimed in claim 11, wherein a bellow is defined within at least one of said first and second sides.

13. The gripper as claimed in claim 11, wherein the sides are formed of a first material, and present differing thickness.

14. The gripper as claimed in claim 1, wherein each finger further includes at least one fixed impedance member mechanically in parallel with said at least one variable member, wherein said at least one fixed impedance member presents a fixed total impedance.

15. The gripper as claimed in claim 14, wherein said at least one fixed impedance member comprises spring steel or hard polymer.

16. The gripper as claimed in claim 14, wherein the at least one variable member includes a laminate formed from first and second thermally activated shape memory polymer elements presenting differing switching temperatures.

17. The gripper as claimed in claim 14, wherein the second impedance is considerably less than and the first impedance is considerably greater than the total fixed impedance.

18. The gripper as claimed in claim 1, wherein the elements comprise an active material selected from the group consisting essentially of shape memory polymers, shape memory alloys, ferromagnetic shape memory alloys, and magnetorheological elastomers.

19. A robotic gripper adapted to engage at least one object and presenting a mechanical impedance, the robotic gripper comprising:
   at least two fingers presenting one of a plurality of collective non-encompassing, partially, or fully encompassing spatial relations relative to said at least one object, each finger drivenly coupled to at least one low impedance actuator operable to cause the finger to take on another of the plurality of collective spatial relations, and including an active material operable to undergo a reversible change in mechanical impedance when exposed to or removed from an activation signal, so as to present activated and deactivated states respectively;

wherein the impedance presents a first value when the material is caused to achieve one of said activated and deactivated states, and a second value less than the first when caused to achieve the other of said activated and deactivated states, wherein the active material is selected from the group consisting essentially of shape memory polymers, shape memory alloys, ferromagnetic shape memory alloys, and magnetorheological elastomers, and wherein each finger presents a continuous geometric shape defining a plurality of longitudinal regions, each region comprises a portion of the material, each portion is separately activated and deactivated, and each finger is configured such that the first value is operable to present a rigid finger, and the second value is operable to present a compliant finger.

20. A method of grasping an object with a mechanical gripper, wherein the gripper presents a first configuration and comprises a first active material defining a first mechanical impedance, and wherein the active material is selected from the group consisting essentially of shape memory polymers, shape memory alloys, ferromagnetic shape memory alloys, and magnetorheological elastomers, said method comprising the steps of:
   a. positioning the gripper relative to the object;
   b. activating the material, so as to lower the impedance to a second impedance;
   c. applying an actuation force to the gripper, when the material is in the second impedance;
   d. causing the gripper to achieve a second configuration, wherein the object is grasped, as a result of the force;
   e. deactivating the first material, so as to return to the first impedance; and
   f. removing the force after the material has returned to the first impedance, so as to lock the gripper in the second configuration.

21. The method as claimed in claim 20, wherein steps c) and f) further include the steps of engaging and disengaging a mold or structural support, and engaging and disengaging a sinuous hole defined by the object.

* * * * *